United States Patent [19]
Otsuka

[11] Patent Number: 5,262,877
[45] Date of Patent: Nov. 16, 1993

[54] IMAGE AND VOICE EDITING SYSTEM FOR ALLOWING VARIOUS IMAGES AND VOICES TO BE REPRODUCED AS ASSOCIATED WITH EACH OTHER

[75] Inventor: Kikuo Otsuka, Tokyo, Japan
[73] Assignee: Fuji Photo Film Co., Ltd., Kanagawa, Japan
[21] Appl. No.: 926,024
[22] Filed: Aug. 7, 1992

Related U.S. Application Data
[63] Continuation of Ser. No. 485,653, Feb. 27, 1990, abandoned.

[30] Foreign Application Priority Data
Mar. 3, 1989 [JP] Japan ............................ 1-50021

[51] Int. Cl.⁵ .................... H04N 5/76; H04N 5/85
[52] U.S. Cl. ............................ 358/343; 358/342; 358/335; 360/19.1
[58] Field of Search ............... 358/311, 335, 342, 341, 358/343; 360/10.1, 14.1, 14.2, 14.3, 19.1; 369/32

[56] References Cited
U.S. PATENT DOCUMENTS
| | | | |
|---|---|---|---|
| 4,768,105 | 8/1988 | Aoki | 360/14.1 |
| 4,777,537 | 10/1988 | Ueno et al. | 358/342 |
| 4,794,465 | 12/1988 | Van Luyt et al. | 358/341 |
| 4,887,161 | 12/1989 | Watanabe et al. | 358/906 |
| 4,947,265 | 8/1990 | Hayashi et al. | 358/341 |
| 4,953,035 | 8/1990 | Yoshio | 358/335 |
| 4,985,784 | 1/1991 | Tsuboi et al. | 358/342 |

FOREIGN PATENT DOCUMENTS
62-269584 11/1987 Japan.

OTHER PUBLICATIONS
"Development of High Vision TV Photo System", vol. 12, No. 40, pp. 7-12 (1988).

Primary Examiner—Tommy Chin
Assistant Examiner—Huy Nguyen
Attorney, Agent, or Firm—Birch, Stewart, Kolasch & Birch

[57] ABSTRACT

An image and voice editing system for editing a file recording medium having a first recording area with sample frames including prerecorded images and voices and a second recording area available for recording thereon. A desired image is recorded in the second recording area by the user. In the second recording area, data representing a correspondence relationship defining a correspondence between a prerecorded image of a sample frame and a desired image for reproduction is also recorded. The data representing the correspondence relationship recorded in the second recording area is referenced to incorporate the desired image recorded in the second recording area into a sample frame recorded in the first recording area to reproduce the desired image together with a corresponding voice.

16 Claims, 4 Drawing Sheets

IMAGE AND VOICE EDITING SYSTEM FOR ALLOWING VARIOUS IMAGES AND VOICES TO BE REPRODUCED AS ASSOCIATED WITH EACH OTHER

This application is a continuation of application Ser. No. 07/485,653 filed on Feb. 27, 1990, now abandoned.

BACKGROUND OF THE INVENTION

1. Field of the Invention

The present invention relates to an image and voice editing system, and more particularly, to an image and voice editing system which stores image data and voice data in a file storage medium, such as an optical disk, and reproduces the same as associated with each other.

2. Description of the Prior Art

A need exists for a convenient image and voice editing system which stores an image and a voice in a file storage medium, such as an optical disk, and reproduces them as associated with each other. For example, the Japanese Patent Laid-Open Publication No. 269584/1987 discloses a recording and playback apparatus and a method thereof in which a voice signal and an image signal are combined with each other to be successively recorded on an optical disk. In this apparatus, the combinations of the voices and images thus recorded on the optical disk are almost fixed thereon. In playback operation, the user is allowed to select either one of selection branches associated with the combinations to the extent that only a limited degree of freedom is assigned to the combinations. For example, when voices are recorded in English and French, the user selects either of these languages. In this apparatus, however, the images and the voices cannot be recorded for the purpose of allowing them to be reproduced in arbitrary combinations thereof.

To cope with this difficulty, an image filing system has been proposed in the article, Keinosuke Murakami et al., "Development of High-Vision TV-Photo System", Technical Report of the Institute of Television Engineers of Japan, Vol. 12, No. 40, pp. 7-12 (1988). In this system, image and voice signals are recorded in an optical file and are edited thereafter, thereby permitting the recorded signals to be reproduced in arbitrary combinations. This system has a high degree of freedom with respect to editing and is hence suitable for commercial purposes. However, when a search is conducted on the file by means of a playback apparatus, the playback apparatus is so adapted as to locate the pickup device thereof alternately over track positions on the file where image and voice signals to be retrieved are recorded. Consequently, the access time is great with respect to the overall processing time, which leads to a problem of reduction of the data transfer rate in the entire operation.

SUMMARY OF THE INVENTION

It is therefore an object of the present invention to provide a convenient image and voice editing system which enables the user to record images and voices on a file storage medium so as to reproduce the recorded images together with the associated voices.

Another object of the present invention is to provide an image and voice editing apparatus applicable to such an editing system, and also to provide a file storage medium applicable to the system.

In accordance with the present invention, an image and voice editing method comprises the steps of preparing a file recording medium having a first recording area in which first data representative of a sample or frame of an image and a voice is recorded and a second recording area available for recording, recording second data representative of a desired image in the second recording area of the file recording medium, and recording in the second recording area third data representative of a correspondence relationship which defines a correspondence between the sample or frame and the desired image in reproduction of the sample or frame, whereby, when the file recording medium is read to reproduce the desired image together with the voice, the third data recorded in the second recording area is referenced to incorporate the desired image recorded in the second recording area into the sample or frame recorded in the first recording area.

Also in accordance with the present invention, an image editing apparatus comprises a recorder, which is to be loaded with a file recording medium having a first recording area in which first data representative of a sample or frame of an image and a voice is recorded and a second recording area available for recording, for recording image signals in the file recording medium, a storage element for temporarily storing image signals representing a desired image, and a controller for reading out the image signals from the storage element and controlling the recorder to record the image signals in the second recording area of the file recording medium.

An image editing apparatus in accordance with the present invention may also comprise a reader for reading out and reproducing the image controller controlling the reader to read the first data recorded in the first recording area, and controlling the recorder to record a second data representative of a correspondence relationship which defines a correspondence between the desired image and the sample or frame in the second recording area.

In accordance with the present invention, furthermore, the controller may be adapted to control the reader to reference the second data recorded in the second recording area, and to incorporate the desired image recorded in the second recording area into the sample or frame recorded in the first recording area to reproduce the desired image together with the voice.

Further in accordance with the present invention, there is further provided a file recording medium comprising a first recording area in which a first data representative of a sample or frame of an image and a voice is recorded and a second recording area available for recording therein a second data representative of a correspondence relationship defining a correspondence between a desired image and the sample or frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings, which are given by way of illustration only and thus are not limitative of the present invention, in which.

DESCRIPTION OF THE PREFERRED EMBODIMENT

Figure 1:
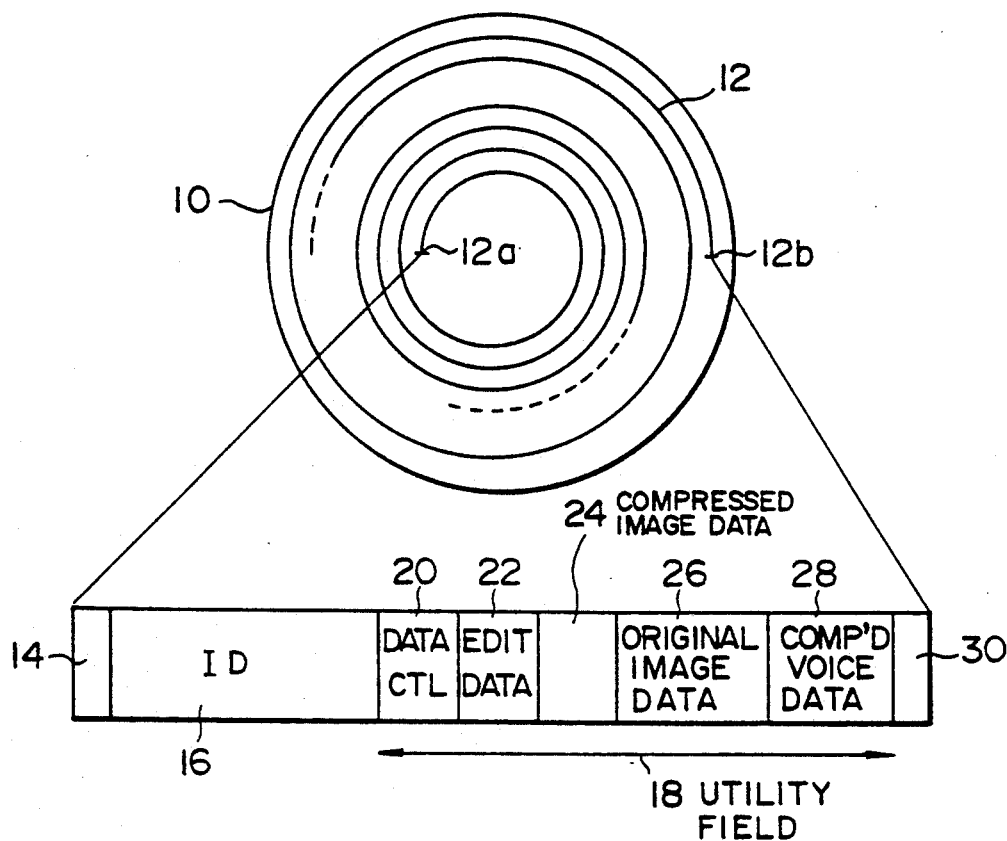
FIG. 1 is a schematic view useful for understanding a recording format on an optical disk adapted to an embodiment of an image and voice editing system in accordance with the present invention.
Figure 4:
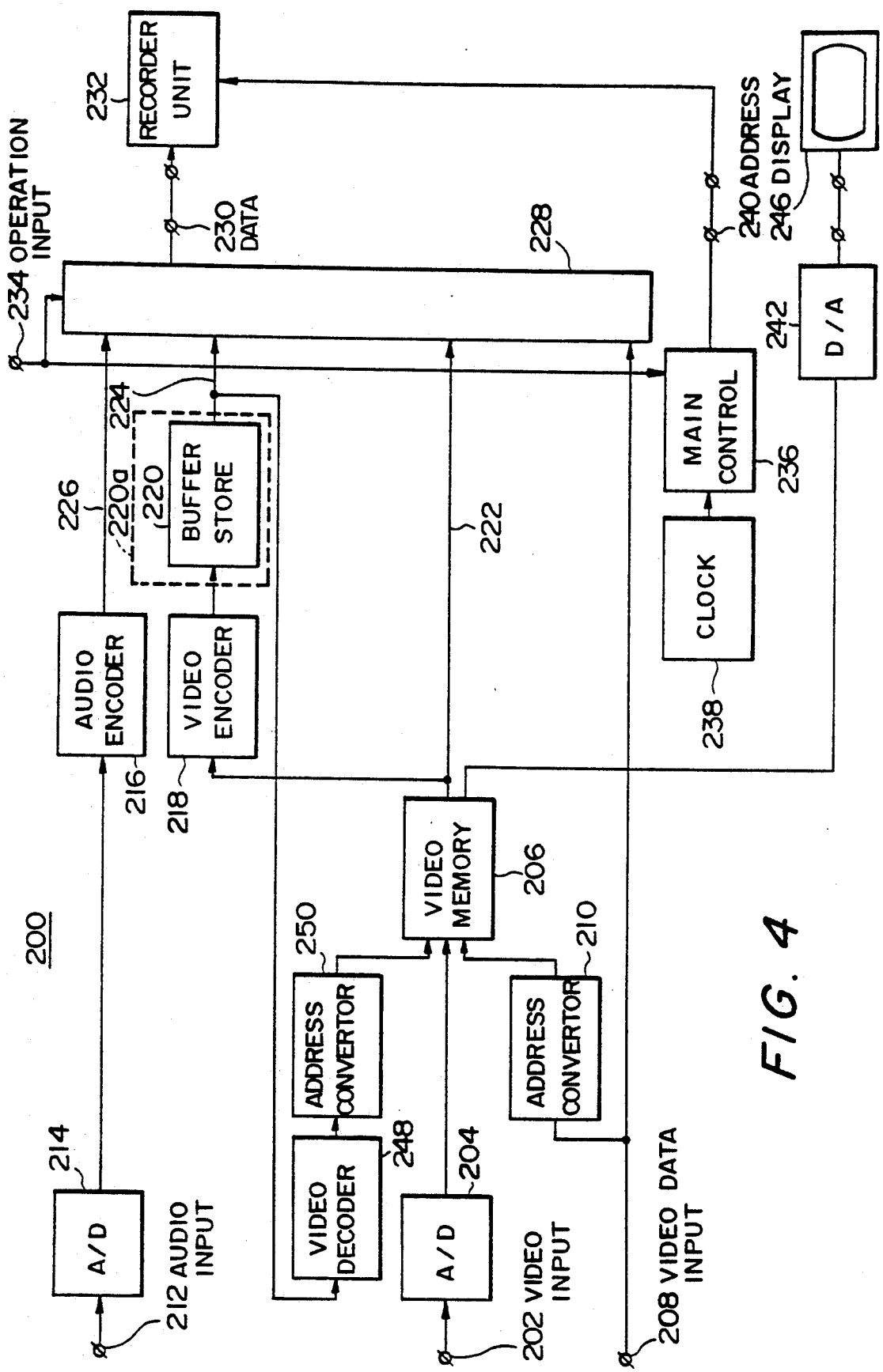
FIG. 4 is a schematic functional block diagram showing a configuration example of a sequential recording apparatus for the optical disk used in the embodiment.
Figure 5:
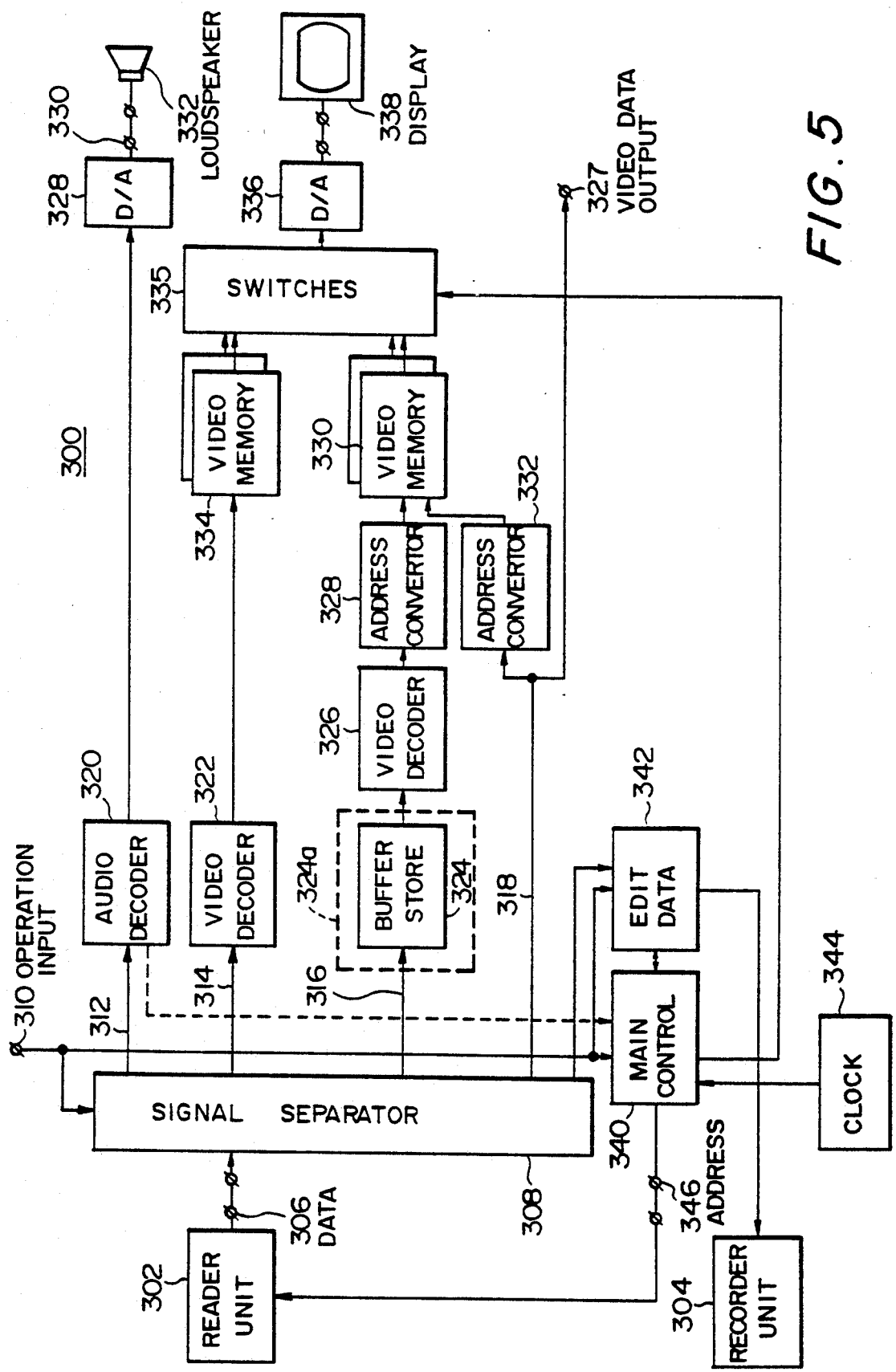
FIG. 5 is a schematic functional block diagram showing a configuration example of an editing and playback apparatus for the optical disk used in the embodiment.

Referring next to the drawings, a description will be given in detail of an embodiment of an image and voice editing system in accordance with the present invention. Referring to FIG. 1, in the present embodiment, the user is supplied with a write-once type of optical disk 10, such as a compact disk, which is beforehand formatted to form blank recording positions and/or fields available for the recording of images and/or voices, or on which images and/or voices are recorded as "specimens" or "samples" in a predetermined format. The user records desired images and voices by means of a recorder or recording apparatus 200. FIG. 4. The optical disk 10 is then loaded in an editor or editing apparatus 300. FIG. 5. to edit the images and voices in so a manner such that those images and voices are framed into the formatted recording fields or "frames". Alternatively, the editing is carried out so that a desired image or voice is recorded to replace a sample thus recorded beforehand.

On the optical disk 10 supplied to the user, a track 12 is formed extending from the central portion to the periphery thereof as shown in FIG. 1. In the range from the start point 12a to the end point 12b of the track 12, data is written in the format shown in the bottom of the figure. The optical disk 10 is merely an example of a file recording medium applicable to this apparatus.

The start point 12a of the track 12 is followed by a lead-in field 14, an identification field 16 and a user or utility field 18 in this order. The utility field 18 is a recording area in which the user may arbitrarily write an image, a voice, and data thereinto. The identification field 16 is adapted to include format information defining a frame for information to be written in the utility field 18, a program defining procedures and operations for the editing and playback, and images and voices as "samples".

The utility field 18 includes as shown in the figure a data control field 20, an edit data field 22, compressed image data field 24, an original image data field 26, and a compressed voice data field followed by a lead-out field 30. First, the original image data field 26 is a recording area in which desired image data is written in the form of original image data not compression-encoded. Image data, after compression-encoded, is written in the compressed image data field 24. The compressed voice data field 28 is used to be recorded with a desired voice in the compression-encoded form. The data control field 20 is an area in which control data such as a type and an identification code of the disk 10 is recorded. The edit data field 22 is disposed to be written with a conversion table 32, FIG. 2, which defines correspondences between the images and voices recorded as specimens in the identification field 16 and those recorded in the utility field 18.

Figure 2:
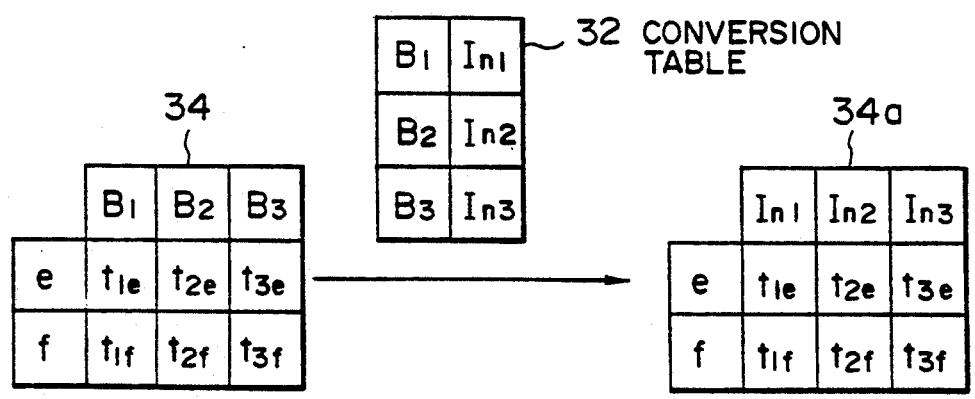
FIG. 2 is a schematic diagram showing an example of an editing process executed in the embodiment of the invention.

As shown in FIG. 2, assume here that, for example, three frames or pieces of images B1, B2, and B3 are recorded as samples in the identification field 16 and that two series of voices e and f related thereto are also recorded therein. A reproduction timing of those items is defined as shown in the control table 34. As seen in FIG. 2, for the timing points of the voices e and f, the successive timing points t1e, t2e and t3e, and t1f, t2f and t3f are respectively specified. The control table 34 is written in the identification field 16.

The control table 32 formed in the edit data field 22 of the utility field 18 is then loaded with data representative of the correspondence relationship as shown in FIG. 2. This gives rise to make the images B1, B2, and B3 associated with the new images In1, In2, and In3, respectively. In playing back the disk 10 loaded with the conversion table 32 by means of a playback apparatus 300, the image specification items B1, B2, and B3 of the control table 34 are altered into the items In1, In2, and In3, respectively. Based on the correspondence relationship denoted by a resultant control table 34a, the playback is carried out. In other words, in place of the sample images B1, B2 and B3, the images In1, In2 and In3 are reproduced. The sample images B1, B2 and B3 may be blank. In the latter case, the desired images In1, In2 and In3 are reproduced as if they have been recorded in those blank fields or frames.

Figure 3:
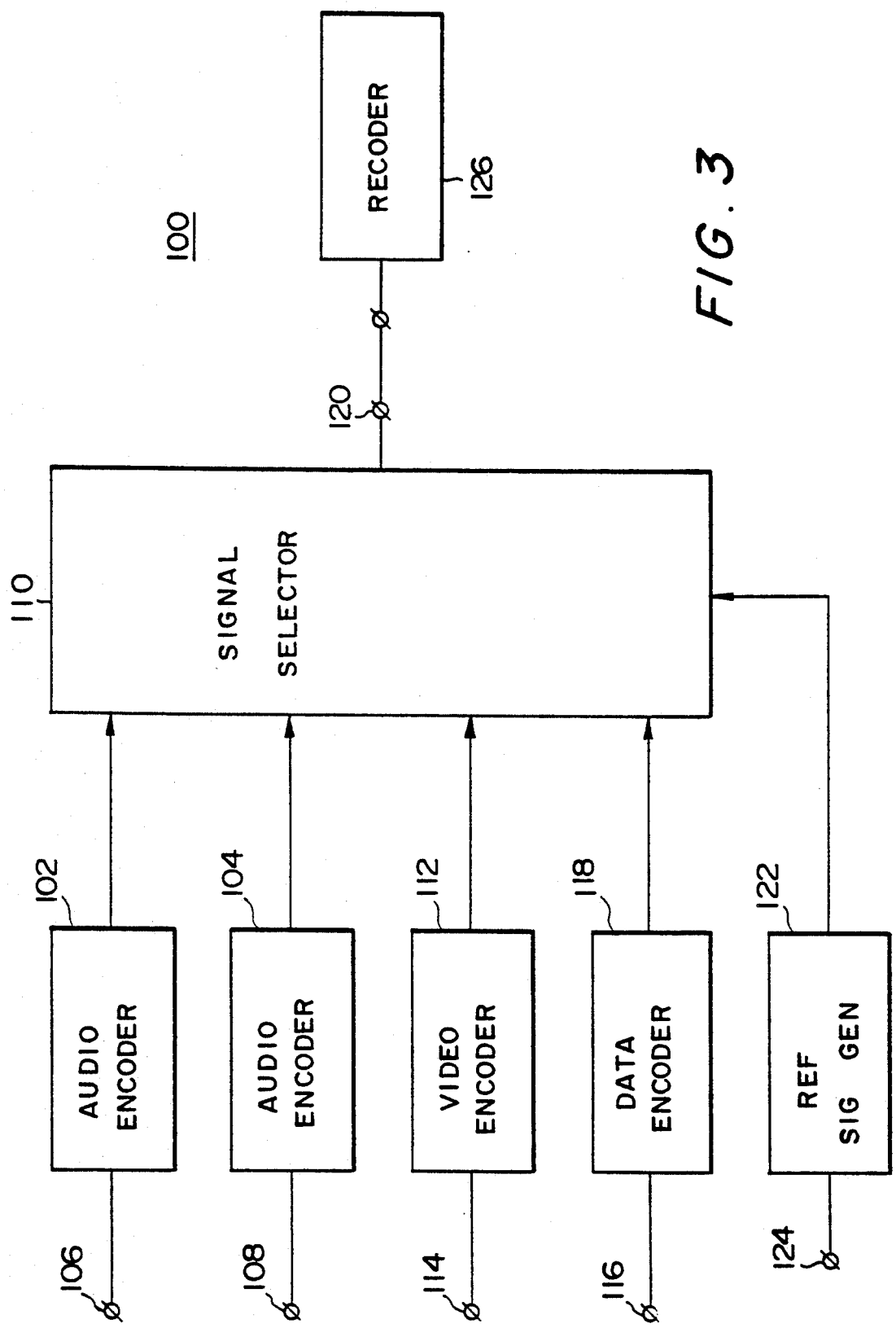
FIG. 3 is a functional block diagram schematically showing a configuration example of a recording apparatus for an optical disk used in the embodiment.

The supplier of the optical disk 10 writes "samples" or "frames" in the identification field 16 of the optical disk by means of a recorder or recording apparatus 100 as exemplified in FIG. 3. This disk 10 is supplied as a so-called CD-WO (write-once type of compact disk) to the user.

In this embodiment, as shown in FIG. 3, the recorder 100 includes two voice or audio encoders 102 and 104. Those encoders 102 and 104 receive voice or audio signals supplied respectively from audio inputs 106 and 108 to conduct a compression encoding thereon to deliver encoded outputs to a signal selector unit 110. Connected also to the signal selector 110 is an image encoder 112 which encodes image signals fed from an video input 114. The encoded image data is fed to the signal selector unit 110. This apparatus 100 further comprises a data encoder 118, which encodes data supplied from an data input 116 to send the encoded data to the signal selector 110.

The signal selecting unit or signal selector 110 is a selecting circuit which selectively outputs encoded data items received from the encoders 102, 104, 112, and 118 along output 120. The signal selector 110 is also connected to a reference signal generator 122. The generator 122 is responsive to a control signal received by its control input 124 to produce a reference signal to the signal selector unit 110 and to respective units of the apparatus 100.

The output 120 from the signal selecting unit 110 is linked with a recorder unit or recorder 126. This recorder 126 is an optical disk recorder for writing data on the optical disk 10 in conformity with the format shown in FIG. 1.

For example, when the image signals representing the pieces or frames of images B1, B2, and B3 are sup;lied from the image input 114 to the image encoder 112, the signals are encoded by the encoder 112 and the resultant signals are then delivered to the signal selector 110. The audio encoder 102 is supplied with the audio signal e, for example, from the audio input 106. The signal is encoded therein to be fed to the selecting unit 110. Similarly, the audio encoder 104 receives an audio signal f, for example, from the audio input 108. The resultant, encoded signal is sent to the selecting unit 110. Data supplied to the input 116 is also encoded by the data encoder 118 to be fed to the selector 110. The data includes the control table 34 stipulating the correspondence relationships between the images B1, B2 and B3, and the two series of voices e and f associated therewith.

The signal selector 110 selects inputs from the encoders 102, 104, 112 and 118 in the predetermined format contained in the identification field 16 to connect the input to the output 120. Those encoded voice, image, and data are written in the identification field 16 of the disk 10 by means of the recorder 126. The selector unit 110 also transfers the reference signal produced from the reference signal generator 122 to the output 120. The transferred reference signal is then recorded by means of the recorder 126 in a subheader which is contained in a data frame of the identification field 16.

The optical disk 10 having the identification field 16 thus loaded with the encoded data is supplied to the user. Desired data may be recorded in the utility field 18 thereof by means of a sequential recording apparatus or recorder 200 shown in FIG. 4, for example. Desired image signals to be written on the optical disk 10 are fed to a video input 202 of the recorder. The image signal is converted through an analog-to-digital. A/D, converter 204 into digital data associated therewith. The resultant, converted signal is temporarily stored in a video memory 206. Image data from a digital video signal source such as an image scanner is supplied to a digital, video data input 208. The data signal is converted in respect of address by an address convertor 210 to store the signal also in the video memory 206. The image data thus stored in the video memory 206 can be read out therefrom via a digital-to-analog. D/A, converter 242 to a display 246 under the control of a main control unit 236 responsive to an operational input 234. The operator therefore can visually check the contents of the displayed image.

An audio signal to be recorded on the optical disk 10 in association with the image signals is supplied to a voice input 212. The audio signal is then converted into associated digital data through an analog-to-digital, A/D, converter 214 to be encoded by an audio encoder 216.

The image data stored in the video memory 206 is processed through compression encoding, such as a discrete cosine conversion or translation, in a video encoder 218. The resultant data is stored in a buffer storage 220. For example, assuming that a frame of original image signals constituted with 768 pixels by 480 horizontal scan lines is attained by sampling with the ratio of 2:1:1 with respect to the luminance and the chroma signals, when the signals are compressed through the discrete cosine conversion in a relationship of one bit per pixel, the resultant compressed data includes about 50K bytes.

The video memory 206, the buffer storage 220, and the audio encoder 216 respectively produce outputs 222, 224, and 226. These outputs are connected to a signal selector unit 228, which generates an output 230 to be fed to a recording unit or recorder 232. The recorder 232 is loaded with an optical disk 10 which has been partially recorded in advance by the supplier thereof such that the above-noted image and/or voice signals are written in the utility field 18. FIG. 1, thereof. The signal selector 228 is responsive to an operation signal supplied from an operation input 234 to selectively connect those inputs 222, 208, 224, and 226 to the output 230. As a result, the video and audio signals are selectively written in the optical disk 10 by means of the recorder 232.

In response to instructions supplied from the operational input 234, the main control or controller unit 236 creates an address designating a track 12 on the optical disk 10 in time with a clock 238. The obtained address is fed to an output 240. For example, in response to the instructions for recording an original image supplied to the operational input 234, the signal selecting unit 228 selects the input 222 from the video memory 206. Consequently, the main control 236 generates an address of an original image data field 26 on the optical disk 10. The address is delivered to the recorder 232. Furthermore, the controller 236 sends read-out instructions to the video storage 206, which accordingly supplies the original image data therefrom. The attained data is fed via the signal selector unit 228 to the recorder 232 so as to be written in the original image data field 26 on the optical disk 10. In order to avoid complexity of the figure. control lines from the controller 236 to respective circuit elements are omitted.

The compressed image data stored in the buffer memory 220 is read out therefrom into the recorder 232 to be written in the compressed image data field 24 on the optical disk 10. The image data supplied to the digital video data input 208 is directly fed to the selector 228 to be written in the original image data field 26 by means of the recorder 232. Furthermore or alternatively, the image data is temporarily stored in the video memory 206 and is then written in the compressed image data field 24 in the similar fashion to the analog image signal.

The voice signal related to the image data is supplied to the audio input 212 to be converted into associated digital data through the analog-to-digital converter 214. The resultant signal is subjected to a compression encoding in the audio encoder 216. The obtained data is recorded in the compressed voice data field 28 by the recorder 232 in the similar fashion to what is described above.

The buffer store 220 may be, as indicated with a broken line 220a, an external memory such as a memory card, which can be detachably loaded to this apparatus. In such a case, the compressed image data may be preserved as a file in a file storage device such as an external memory 220a.

The sequential recorder 200 can decode the compressed image data stored in the buffer 220 to obtain original image data. For this purpose, a video decoder 248 is adapted therein to expand the compressed video data. The resultant, expanded data undergoes an address translation in an address translator or conversion unit 250 to be stored in the video memory 206. Thereafter, the data is processed in the fashion similar to what is done for the video data. This function is efficient when the buffer store 220 is an external memory 220a, and only compressed image data can be obtained from the external device, for example.

The optical disk 10 on which the image and voice data are thus stored in the utility field 18 by means of the sequential recorder 200 can be desirably edited by use of the edit and playback apparatus 300. In order to avoid complexity of description, the edit and playback apparatus 300 is shown as a separate device with respect to the sequential recorder 200. However, the apparatus 300 may be integrally configured together with the recorder 200. The optical disk 10 on which the image and voice data are stored by the sequential recorder 200 is set in a reader unit 302. The apparatus 300 is also provided with a recording function, which is shown as a recorder unit 304 in this figure for convenience of description.

The reader unit 302 has a reproduced output 306 connected to a signal separator unit 308. The latter unit 308 is a selecting circuit which is responsive to an operational input 310 to selectively connect the input 306 to outputs 312, 314, 316, and 318. These outputs are respectively linked with an audio decoder 320, a video decoder 322, a buffer store 324, and a digital video data output 327. The signal separator 308 is adapted to separate, from the data read out from the reader unit 302 to the input 306 thereof, video data recorded in the identification field 16 to the output 314, compressed image data written in the compressed image data field 24 to the output 316, and voice data to the output 312. When original image data stored in the original image data field 26 is directly used, this unit 308 delivers the original image data to the output 318.

The audio decoder 320 decodes audio or voice data supplied to the input 312 to feed the resultant data to a digital-to-analog converter 328. The converted data is reproduced in the form of an audible sound or voice from a loudspeaker 332 connected to an output 330 of the D/A converter 328. The video decoder 322 decodes image data supplied to the input 314 to deliver the resultant data to a video memory 334 to be stored therein. The buffer memory 324 has an output coupled with a video decoder 326. The decoder 326 expands compressed image data read out from the buffer memory 324. The decoded image data is converted in its address by the address convertor unit 328 to be in turn stored in the image memory 330. The video memories 330 and 334 include a couple of storage areas which are alternately switched in the operation thereof. Image data attained at the output 318 of the signal separator 308 is converted in its address by the address convertor 332 to be stored in the video memory 330.

Image data stored in the video memories 334 and 330 are selectively read out via a switch unit or switches 335 into a digital-to-analog converter 336 to be converted into associated analog signals. The obtained analog signals are reproduced in the form of a visible image on a display 338.

In order to implement a function in which the user desirably edits image and voice data stored in the utility field 18 of the optical disk 10 by use of the "frame" or "sample" included in the identification field 16, the instant apparatus 300 is provided with a main control unit 340 responsive to the operation input 310. This provision enables the user to create or modify the contents of the edit data field 22 of the utility field 18. The main control 340 is connected to a memory 342 functioning as a work area to temporarily store and process the edit data 22. The processed edit data is then written by the recorder 304 in the edit data field 22 of the optical disk 10. To avoid complexity of the figure, control lines from the controller 340 to respective circuit components are omitted.

In an editing, the controller 340 is responsive to instructions supplied from the operational input 310 to generate at an output 346 an address for the track 12 on the optical disk 10 in time with a clock 344. For example, the user supplies the operation input 310 with instructions to reproduce a compressed image already recorded on the optical disk 10, and the reader unit 302 reads in response thereto the compressed image data from the compressed image data field 24 of the optical disk 10. The obtained data is thereafter transferred to the buffer memory 324 via the signal separator 308. The compressed image data is stored in the buffer store 324 to be then decoded by the video decoder 326. The decoded data is processed by the address translator or converter 328 into a reduced frame of image having a predetermined picture size. The data representative of the reduced frame of image is then stored in a portion of a storage area in the video storage 330, which portion corresponds to a full size of the picture screen 330. Similarly, other frames of compressed image data are read out from the data area 24 to be stored as minimized pictures in other respective portions of the storage area in the video memory 330. As a result, the video memory 330 will be loaded with image data constituted with a set of a plurality of reduced images, so that a multi-screen image data is completed. The data of a multi-screen image can be delivered via the switches 335 and the digital-to-analog converter 336 to the display 338 so as to be reproduced in the form of a multi-screen partially on the display 338.

In this situation, for an editing operation, upon selection by the user of an image already recorded as a sample on the optical disk 10, such as the image B1 in the example of FIG. 2, and supplying the operation input 310 with playback instructions associated with the selected image B1, the reader unit 302 retrieves image data thereof from the identification field 16 of the optical disk 10 to send the obtained data via the signal separator 308 to the image decoder 322. The image data, thus read out, is in turn decoded in the decoder 322 to be then stored in a storage area corresponding to a screen in the video memory 334. At the time the image data is reproduced on the display 338, the switches 335 preferentially control the data representing the multi-screen stored in the video memory 330. In consequence, a window is opened in the screen of the display 338 on which the image coming from the video memory 334 is visualized to reproduce the multi-screen image therein as a visible image.

Subsequently, in response to selecting a desired image by the operator from the multi-screen image presented on the display 338, such as the image In1 in the example of FIG. 2, the main control 340 sends data of the image In1 stored in the buffer memory 324 to the image decoder 326 to decode the data again. The decoded data is copied onto another storage area of the video memory 330. The copied data is then selectively transferred by means of the switching unit 335 to be displayed on the display 338. In addition, the control unit 340 recognizes that the image In1 desired by the user is specified in association with the original image B1 created by the supplier so as to accordingly generate a conversion table 32. FIG. 2, including a correspondence relationship establishing an association between the images B1 and In1. This operation is accomplished by use of the memory 342.

The conversion table 32 thus stipulates the relationship of the image In1 which is produced by the user and is to be replaced for the image B1 of the sample stored in the identification field 16 of the optical disk 10. The controller 340 sends, in response to the instructions from the operation input 310, the edit data 342 to the recorder 304, which in turn writes the data in the edit data field 22 on the optical disk 10. The image B2 and subsequent images may also be sequentially replaced with desired images in the similar procedure. In a case where optical disk 10 is used of which the identification field 16 does not include such sample images but only "frames" or "layouts", desired images can be incorporated into the frames.

When the optical disk 10 containing the conversion table 32 recorded thereon is reproduced in the edit and playback apparatus 300, the program stored in the identification field 16 of the optical disk 10 is read therefrom into the main control 340 by means of the reader unit 302 and the edit data is transferred from the data field 22 to the memory 342. The control unit 340 replaces, according to the edit data 342, the sample images read out of the identification field 16 with the desired images stored in the utility field 18. The image replacement is accomplished in the sequences which will be described below.

The image data stored in the identification field 16 of the optical disk 10 is read out therefrom into the video memory 334. The user's image to be replaced therewith is obtained from the original data field 26 or the compressed image data field 24 to be in turn stored in the buffer memory 324. When the original image data is to be used, the data delivered from the original image data field 26 is directly fed on the signal line 318 to be thereafter written in the video memory 330. The main control 340 replaces, in accordance with the conversion table 32, the image B1, for example, with a user's image, such as the image In1.

Specifically, in place of an operation to retrieve a sample image from the video memory 334, an operation to retrieve the image data from the buffer memory 324 is achieved. The obtained data is decoded by the image decoder to be in turn stored in the video memory 330. The switch unit 335 transfers the image data read out from the video memory 330 to the display 338 for visualization. In this case, the reader unit 302 reads out data designating a relationship between the voice and the image, namely, the control table 34, from the identification data field 16 of the optical disk 10 to pass the data of table 34 to the main control 340. In addition, the voice data items e and f are also read out and selectively decoded by the audio decoder 320, thereby being reproduced in the form of an audible sound from the loudspeaker 332. As a result, in place of the specimen image B1, the user's image In1 is presented on the display 338.

The voice data written in the compressed voice data area 28 of the optical disk 10 may be utilized when it is to be additionally inserted during playing back the voice and the image defined by the control table 34a, for example. In this operation, the reader unit 302 retrieves voice data from the compressed voice data field 28 of the optical disk 10. The obtained voice data is reproduced in the manner similar to that done for the voice data recorded in the identification data field 16.

Also in the edit and playback apparatus 300, the buffer memory 324 may comprise an external memory such as a memory card, which is detachably loaded to the apparatus 300, as shown by a broken line 324a in FIG. 5. The external memory 324a may be a random access memory, RAM, with a memory capacity of 4M bits in which ten frames of compressed image data can be stored, for example. When the memory card 324a or 220a, FIG. 4, conforms to standards regulated with respect to digital electronic still cameras, image data can be supplied from such a memory card to this system.

In the embodiment described above, the optical disk on which the supplier records sample images and voices or frames by means of the recorder 100 is delivered to the user. A mass production may be adopted to manufacture such disks 10 on a commercial basis. The user replaces the sample image with a desired image by use of the edit and playback system 200 and 300, or the user matches a desired image with the frame. As a result, an editing of data can be accomplished so that the images produced by the user are reproduced in a desired sequence timed with voices reproduced.

In accordance with the present invention, the user is supplied with an optical disk on which sample images and voices or frames are recorded by use of a recording apparatus. The user replaces the sample images with desired images, or the user incorporates the desired images into the frames. As a result, an editing of data is carried out so as to desirably reproduce the images created by the user. In consequence, a convenient image and voice editing system is provided in which the user records images and voices on a file recording medium so as to be reproduced with associations established therebetween.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An image and voice editing method for use with a file recording medium having a first recording area formatted to include blank recording positions in which first data representative of sample frames wherein both an image and a voice are recorded in each of the sample frames by a manufacturer of the file recording medium and a second recording area available for recording second data representative of desired images and desired voices by a user of the file recording medium, the first and second recording areas being formatted by the manufacturer of the file recording medium, the editing method comprising the steps of:

recording the second data representative of desired images and desired voices in the second recording area of the file recording medium;

recording in the second recording area third data representative of a conversion table prepared by the user to define which of the desired images correspond to the images of the sample frames; and reading the file recording medium, in accordance with an external playback instruction, to reproduce the desired images along with the desired voice recorded in the second recording area, in accordance with the conversion table, the desired images being reproduced in place of corresponding images of the sample frames.

2. The image and voice editing method in accordance with claim 1, further comprising the step of encoding a signal representative of the desired image into the second data prior to said step of recording second data.

3. The image and voice editing method in accordance with claim 2 further comprising the step of compressing the encoded signal prior to said step of recording second data.

4. An image editing apparatus comprising:
store means for temporarily storing image signals, input by a user, representing desired images;
recorder means, operatively coupled to said store means and being loaded with a file recording medium having a first recording area formatted to include blank recording positions in which first data representative of sample frames including both an image and a voice are recorded by a manufacturer of said file recording medium and a second recording area available for recording desired images and desired voices by a user of said file recording medium, for recording image signals on said file recording medium;
control means, coupled to said recorder means and said store means, for reading out the image signals from said store means in accordance with an external instruction and for controlling said recorder means to record the image signals in said second recording area of said file recording medium and to record in said second recording area a conversion table including correspondence data representative of which of the desired images correspond to the images of said sample frames; and
reproducer means, coupled to said control means and said store means, for reading said file recording medium and for reproducing the desired images along with the desired voices recorded in said second recording area in accordance with said correspondence data of said conversion table, the desired images being reproduced in place of images of corresponding sample frames.

5. The image editing apparatus in accordance with claim 4, wherein said store means includes a file storage device detachably connected to the image editing apparatus.

6. The image editing apparatus in accordance with claim 5, wherein said file storage device is an optical disk.

7. The image editing apparatus in accordance with claim 4, wherein said recorder means comprises encoder means for encoding the image signals representative of the desired images.

8. The image editing apparatus in accordance with claim 7, wherein said encoder means compresses the image signals.

9. A method of editing a prerecorded recording medium which includes a first recording area formatted to include blank recording positions wherein sample frames of data representative of images and voices are prerecorded thereon by a manufacturer of the recording medium and a second recording area available for recording desired images and voices by a user, comprising the steps of:
recording data representative of desired images in the second recording area;
recording, in the second recording area, a conversion table including correspondence data defining which of the recorded data representative of desired images corresponds to the prerecorded data representative of images; and
reproducing the prerecorded data representative of voices along with the prerecorded data representative of images or the recorded data representative of desired images, as associated with each other, for each one of the sample frames, in accordance with the conversion table wherein
the recorded data representative of desired images are reproduced along with the prerecorded data representative of voices for a specific sample frame of the sample frames if said correspondence data of the conversion table exists for the specific sample frame, and
the prerecorded data representative of images are reproduced along with the prerecorded data representative of voices for the specific sample frame if said correspondence data of the conversion table does not exist for the specific sample frame.

10. The method of editing a prerecorded recording medium of claim 9, wherein said step of recording data representative of desired images comprises encoding and compressing the data prior to recording.

11. The method of editing a prerecorded recording medium of claim 9, wherein the prerecorded recording medium is an optical disk.

12. The method of editing a prerecorded recording medium of claim 9, wherein the first recording area of the prerecorded recording medium further includes timing data recorded thereon by the manufacturer indicative of the start timing points of the prerecorded data representative of voices.

13. A recording medium editing apparatus for editing a recording medium including a first recording area formatted to include blank recording positions wherein sample frames of data representative of images and voices are prerecorded thereon by a manufacturer of the recording medium and a second recording area which is available for recording desired images and voices by a user, the recording medium editing apparatus comprising:
recording means for recording user data representative of desired images in the second recording area of said recording medium and for recording a conversion table including correspondence data defining which of the recorded user data representative of desired images corresponds with the prerecorded data representative of images;
reproducing means for reproducing the prerecorded data representative of voices along with the prerecorded data representative of images or the recorded user data representative of desired images, as associated with each other, for each one of the sample frames; and
control means, coupled to said reproducing means, for controlling said reproducing means to reproduce
the recorded user data representative of desired images along with the prerecorded data representative of voices for a specific sample frame of the sample frames if said correspondence data of the conversion table exists for the specific sample frame, and
the prerecorded data representative of images along with the prerecorded data representative of voices for the specific sample frame if said correspondence data of the conversion table does not exist for the specific sample frame.

14. The recording medium editing apparatus of claim 13, further comprising:
   input means for receiving the user data representative of desired images; and
   storage means, coupled to said input means and said recording means, for storing and subsequently outputting the user data representative of desired images to said recording means in accordance with an external instruction.

15. The recording medium editing apparatus of claim 14, wherein said storage means is detachably mounted to the recording medium editing apparatus and stores additional user data representative of desired image signals.

16. The recording medium editing apparatus of claim 15, wherein the recording medium is an optical disk.

* * * * *